(12) United States Patent
Nakazawa et al.

(10) Patent No.: US 12,422,898 B2
(45) Date of Patent: Sep. 23, 2025

(54) FOLDABLE ASSEMBLY AND FOLDABLE DISPLAY DEVICE

(71) Applicant: E Ink Holdings Inc., Hsinchu (TW)

(72) Inventors: Kenji Nakazawa, Hsinchu (TW);
Keisuke Hashimoto, Hsinchu (TW);
Yue-Feng Lin, Hsinchu (TW);
Deng-Kuen Shiau, Hsinchu (TW);
Chih-Chia Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 209 days.

(21) Appl. No.: 18/312,596

(22) Filed: May 5, 2023

(65) Prior Publication Data
US 2024/0219974 A1  Jul. 4, 2024

(30) Foreign Application Priority Data

Dec. 28, 2022  (TW) .................................. 111150272

(51) Int. Cl.
G06F 1/16 (2006.01)
(52) U.S. Cl.
CPC .......... G06F 1/1681 (2013.01); G06F 1/1616 (2013.01); G06F 1/1624 (2013.01); G06F 1/1652 (2013.01)
(58) Field of Classification Search
CPC .... G06F 1/1681; G06F 1/1616; G06F 1/1624; G06F 1/1652
USPC ....................................................... 361/679
See application file for complete search history.

(56) References Cited

U.S. PATENT DOCUMENTS

| 9,348,450 | B1 * | 5/2016 | Kim .................... H04M 1/0268 |
| 2006/0197714 | A1 | 9/2006 | Chang |
| 2016/0054756 | A1 | 2/2016 | Lan et al. |
| 2019/0346889 | A1 | 11/2019 | Chen et al. |
| 2021/0011513 | A1 * | 1/2021 | Watamura ............. G06F 1/1652 |
| 2021/0034110 | A1 | 2/2021 | Hamburgen et al. |
| 2021/0157357 | A1 | 5/2021 | Wang |
| 2022/0121249 | A1 | 4/2022 | Li et al. |

(Continued)

FOREIGN PATENT DOCUMENTS

| CN | 217177145 U | 8/2022 |
| TW | M631463 U | 9/2022 |

(Continued)

OTHER PUBLICATIONS

The Notice of Allowance of corresponding TW application No. 111150272 issued on Sep. 21, 2023.

*Primary Examiner* — Allen L Parker
*Assistant Examiner* — Elisa Sasserath
(74) *Attorney, Agent, or Firm* — CKC & Partners Co., LLC (57) ABSTRACT

A foldable assembly includes a main body, a left first guide slot, a right first guide slot, a left swing arm, a right swing arm, a left hinge plate, a right hinge plate, a left housing and a right housing. A left first through hole of the left swing arm is pivotally connected to a positioning holder of the main body by a first cylinder. A right first through hole of the right swing arm is pivotally connected to the positioning holder of the main body by a second cylinder. A left second guide slot of the left hinge plate and a left second through hole of the left swing arm are passed through by a fourth cylinder. A right second guide slot of the right hinge plate and a right second through hole of the right swing arm are passed through by a sixth cylinder.

16 Claims, 10 Drawing Sheets

(56) References Cited

U.S. PATENT DOCUMENTS

2022/0217859 A1* 7/2022 Lee .................. H05K 5/0017
2022/0303371 A1* 9/2022 Liao ................. H04M 1/0268

FOREIGN PATENT DOCUMENTS

TW    M632163 U    9/2022
TW    M633658 U    11/2022

* cited by examiner

FOLDABLE ASSEMBLY AND FOLDABLE DISPLAY DEVICE

RELATED APPLICATIONS

This application claims priority to Taiwan Application Serial Number 111150272, filed Dec. 28, 2022, which is herein incorporated by reference.

BACKGROUND

Field of Invention

The present disclosure relates to a foldable assembly and a foldable display device.

Description of Related Art

A conventional foldable assembly usually has a small radius in order to achieve a fully folded state to save space, so that an object on the conventional foldable assembly is subject to greater bending stress, resulting in unstable product reliability. In other words, if the object on the conventional foldable assembly cannot withstand greater bending stress, the conventional foldable assembly will unable to be folded completely and thereby occupy larger space.

For instance, while conventional foldable display devices can be fully folded and completely closed, a flexible display panel inside may be subject to bending stress in various directions, so that the surface of the flexible display panel may be uneven, resulting in unpredictable defects. Therefore, the conventional display devices are challenged in terms of reliability and mass production.

SUMMARY

One aspect of the present disclosure provides a foldable assembly.

According to some embodiments of the present disclosure, a foldable assembly includes a main body, a left housing, a right housing, left first guide slot, a right first guide slot, a left swing arm, a right swing arm, a left hinge plate, and a right hinge plate. The main body includes a positioning holder. A side of the main body has a left first positioning hole and a right first positioning hole. The left housing is pivotally connected to the main body. The right housing is pivotally connected to the main body. The left first guide slot and the right first guide slot are located in the main body or respectively located in the left housing and the right housing. The left swing arm has a left first through hole and a left second through hole. The left first through hole is pivotally connected to the positioning holder of the main body by a first cylinder. The right swing arm has a right first through hole and a right second through hole. The right first through hole is pivotally connected to the positioning holder of the main body by a second cylinder. The left hinge plate has a left second positioning hole and a left second guide slot. The left second positioning hole and the left first positioning hole of the main body are passed through by a third cylinder such that the left hinge plate is pivotally connected to the main body. The left second guide slot and the left second through hole of the left swing arm are passed through by a fourth cylinder such that the fourth cylinder is configured to slide in the left second guide slot. The right hinge plate has a right second positioning hole and a right second guide slot. The right second positioning hole and right first positioning hole of the main body are passed through by a fifth cylinder such that the right hinge plate is pivotally connected to the main body. The right second guide slot and the right second through hole of the right swing arm are passed through by a sixth cylinder such that the sixth cylinder is configured to slide in the right second guide slot.

In some embodiments, the left swing arm and the right swing arm respectively have a first gear structure and a second gear structure. The first gear structure and the second gear structure mesh with each other.

In some embodiments, when the left housing and the right housing are in an unfolded state, the fourth cylinder is located at an end of the left second guide slot away from a center line of the main body, and the sixth cylinder is located at an end of the right second guide slot away from the center line of the main body.

In some embodiments, when the left housing and the right housing are in a closed state, the fourth cylinder is located at an end of the left second guide slot close to a center line of the main body, and the sixth cylinder is located at an end of the right second guide slot close to the center line of the main body.

In some embodiments, the left housing has a left positioning pole disposed in the left first guide slot located in the main body, and the right housing has a right positioning pole disposed in the right first guide slot located in the main body.

In some embodiments, when the left housing and the right housing are in an unfolded state, the left positioning pole is located at an end of the left first guide slot close to a center line of the main body, and the right positioning pole is located at an end of the right first guide slot close to the center line of the main body.

In some embodiments, when the left housing and the right housing are in a closed state, the left positioning pole is located at an end of the left first guide slot located in the main body away from a center line of the main body, and the right positioning pole is located at an end of the right first guide slot located in the main body away from the center line of the main body.

In some embodiments, the third cylinder extends from the left first positioning hole of the main body into the left first guide slot located in the left housing, and the fifth cylinder extends from the right first positioning hole of the main body into the right first guide slot located in the right housing.

In some embodiments, a cross-sectional profile of the left swing arm and a cross-sectional profile of the right swing arm are arc-shaped.

In some embodiments, the left first guide slot and the right first guide slot are arc-shaped, and the left second guide slot and the right second guide slot are linear.

In some embodiments, the foldable assembly further includes a left junction plate and a right junction plate. The left junction plate is arranged on the left hinge plate and disposed along a left side of the main body. The right junction plate is arranged on the right hinge plate and disposed along a right side of the main body.

In some embodiments, the foldable assembly further includes a left support plate and a right support plate. The left support plate is disposed on the left junction plate. The right support plate is disposed on the right junction plate. The left support plate and the right support plate are configured to support a flexible display panel.

Another aspect of the present disclosure provides a foldable display device.

According to some embodiments of the present disclosure, a foldable display device includes a foldable assembly and a flexible display panel. The foldable assembly includes a main body, a left housing, a right housing, a left first guide slot, a right first guide slot, a left swing arm, a right swing arm, a left hinge plate, and a right hinge plate. The main body includes a positioning holder. A side of the main body has a left first positioning hole and a right first positioning hole. The left housing is pivotally connected to the main body. The right housing is pivotally connected to the main body. The left first guide slot and the right first guide slot are located in the main body or respectively located in the left housing and the right housing. The left swing arm has a left first through hole and a left second through hole. The left first through hole is pivotally connected to the positioning holder of the main body by a first cylinder. The right swing arm has a right first through hole and a right second through hole. The right first through hole is pivotally connected to the positioning holder of the main body by a second cylinder. The left hinge plate has a left second positioning hole and a left second guide slot. The left second positioning hole and the left first positioning hole of the main body are passed through by a third cylinder such that the left hinge plate is pivotally connected to the main body. The left second guide slot and the left second through hole of the left swing arm are passed through by a fourth cylinder such that the fourth cylinder is configured to slide in the left second guide slot. The right hinge plate has a right second positioning hole and a right second guide slot. The right second positioning hole and right left first positioning hole of the main body are passed through by a fifth cylinder such that the right hinge plate is pivotally connected to the main body. The right second guide slot and the right second through hole of the right swing arm are passed through by a sixth cylinder such that the sixth cylinder is configured to slide in the right second guide slot. The flexible display panel is disposed on the foldable assembly.

In some embodiments, the left housing has a left frame and the right housing has a right frame. The left frame is disposed along an edge of a left half of the flexible display panel. The right frame is disposed along an edge of a right half of the flexible display panel.

In some embodiments, the left swing arm and the right swing arm respectively have a first gear structure and a second gear structure. The first gear structure and the second gear structure mesh with each other.

In some embodiments, the foldable display device further includes a left junction plate and a right junction plate. The left junction plate is arranged on the left hinge plate and disposed along a left side of the main body. The right junction plate is arranged on the right hinge plate and disposed along a right side of the main body.

In some embodiments, the foldable display device further includes a left support plate and a right support plate. The left support plate is disposed on the left junction plate. The right support plate is disposed on the right junction plate. The flexible display panel is located on the left support plate and the right support plate.

In the aforementioned embodiments of the present disclosure, the left hinge plate is pivotally connected to the main body, the fourth cylinder passed through the left second through hole of the left swing arm is located in the left second guide slot of the left hinge plate, the right hinge plate is pivotally connected to the main body, the sixth cylinder passed through the right second through hole of the right swing arm is located in the right second guide slot of the right hinge plate, the left housing and a the right housing are pivotally connected to the main body; therefore, the left hinge plate and the left housing may be closed along different trajectories, the right hinge plate and the right housing may be closed along different trajectories, so that when the foldable assembly is in the closed state, the left hinge plate and the right hinge plate are not in contact with each other, and the left housing is in contact with the right housing. Such a configuration enable the flexible display panel on the left hinge plate and the right hinge plate to have a larger bend radius when the foldable assembly is closed, thereby reducing bending stress and related defects, and improving the reliability of the foldable display device. In addition, in the closed state of the foldable assembly, there is no gap between the left housing and the right housing, so that the flexible display panel in the foldable assembly may be protected by the left housing and the right housing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
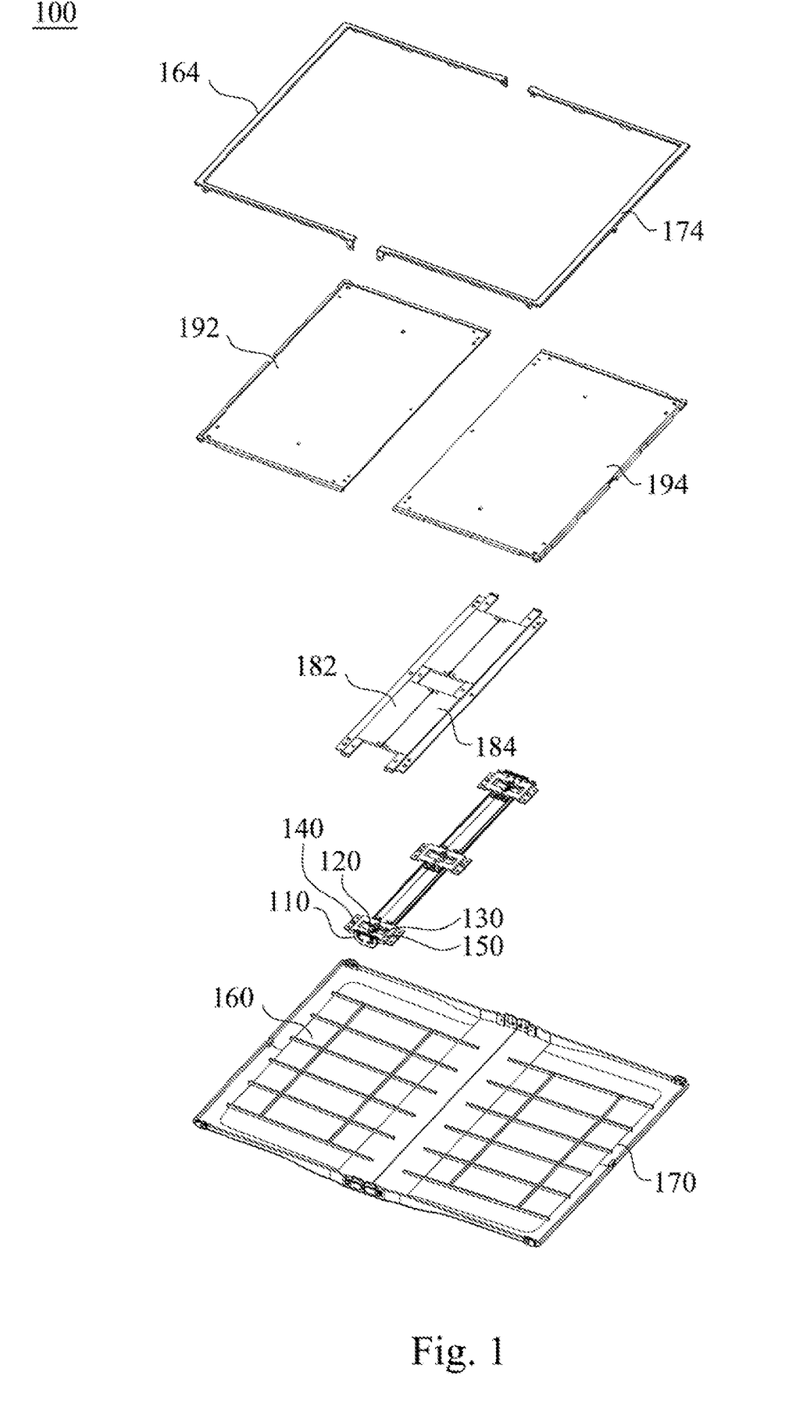
FIG. 1 is an exploded view of a foldable assembly according to one embodiment of the present disclosure.
Figure 2:
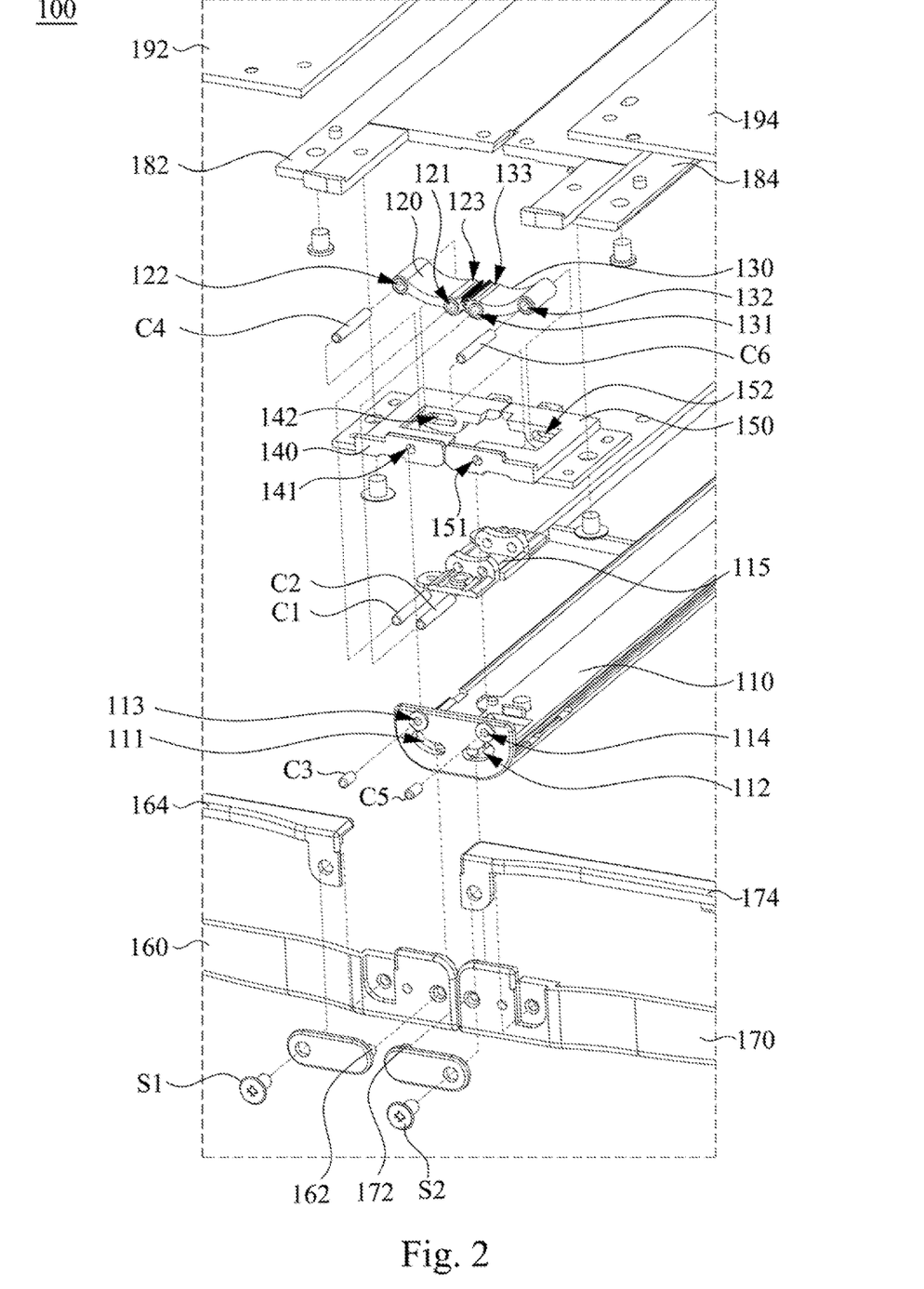
FIG. 2 is a partial enlarged exploded view of the foldable assembly of FIG. 1.

FIG. 1 is an exploded view of a foldable assembly 100 according to one embodiment of the present disclosure. FIG. 2 is a partial enlarged exploded view of the foldable assembly 100 of FIG. 1. As shown in FIG. 1. and FIG. 2, the foldable assembly 100 includes a main body 110, a left first guide slot 111, a right first guide slot 112, a left swing arm 120, a right swing arm 130, a left hinge plate 140, a right hinge plate 150, a left housing 160 and a right housing 170. A side of the main body 110 has a left first positioning hole 113, and a right first positioning hole 114. The main body 110 includes a positioning holder 115. In this embodiment, the main body 110 may include three positioning holders 115, but the present disclosure is not limited in this regard. The left swing arm 120 has a left first through hole 121 and a left second through hole 122 respectively located on opposite sides of the left swing arm 120. The left first through hole 121 is pivotally connected to the positioning holder 115 of the main body 110 by a first cylinder C1. The right swing arm 130 has a right first through hole 131 and a right second through hole 132 respectively located on opposite sides of the right swing arm 130. The right first through hole 131 is pivotally connected to the positioning holder 115 of the main body 110 by a second cylinder C2. The left hinge plate 140 has a left second positioning hole 141 and a left second guide slot 142. The left second positioning hole 141 and the left first positioning hole 113 of the main body 110 are passed through by a third cylinder C3 such that the left hinge plate 140 is pivotally connected to the main body 110. The left second guide slot 142 and the left second through hole 122 of the left swing arm 120 are passed through by a fourth cylinder C4 such that the fourth cylinder C4 is configured to slide in the left second guide slot 142. The right hinge plate 150 has a right second positioning hole 151 and a right second guide slot 152. The right second positioning hole 151 and right first positioning hole 114 of the main body 110 are passed through by a fifth cylinder C5 such that the right hinge plate 150 is pivotally connected to the main body 10. The right second guide slot 152 and the right second through hole 132 of the right swing arm 130 are passed through by a sixth cylinder C6 such that the sixth cylinder C6 is configured to slide in the right second guide slot 152. The left housing 160 and the right housing 170 are pivotally connected to the main body 110. In this embodiment, the left first guide slot 111 and the right first guide slot 112 are located in the main body 110. The left housing 160 has a left positioning pole 162 located in the left first guide slot 111 located in the main body 110, such that the left positioning pole 162 is configured to slide in the left first guide slot 111. The right housing 170 has a right positioning pole 172 located in the right first guide slot 112 located in the main body 110, such that the right positioning pole 172 is configured to slide in the right first guide slot 112.

Moreover, the left housing 160 of the foldable assembly 100 may further includes a left frame 164, the right housing 170 may further have a right frame 174. The left frame 164 and the right frame 174 may secure the edge of the object in the foldable assembly 100 (such as a flexible display panel 210 of FIG. 8) to prevent the object from shifting. In addition, the left housing 160 and the right housing 170 may have a threaded hole respectively. A screw S1 may pass through a plate having the left positioning pole 162 and a through hole of the left frame 164 in sequence, and be fastened in the thread hole of the left housing 160. A screw S2 may pass through a plate having the right positioning pole 172 and a through hole of the right frame 174 in sequence, and be fastened in the thread hole of the right housing 170.

Figure 5:
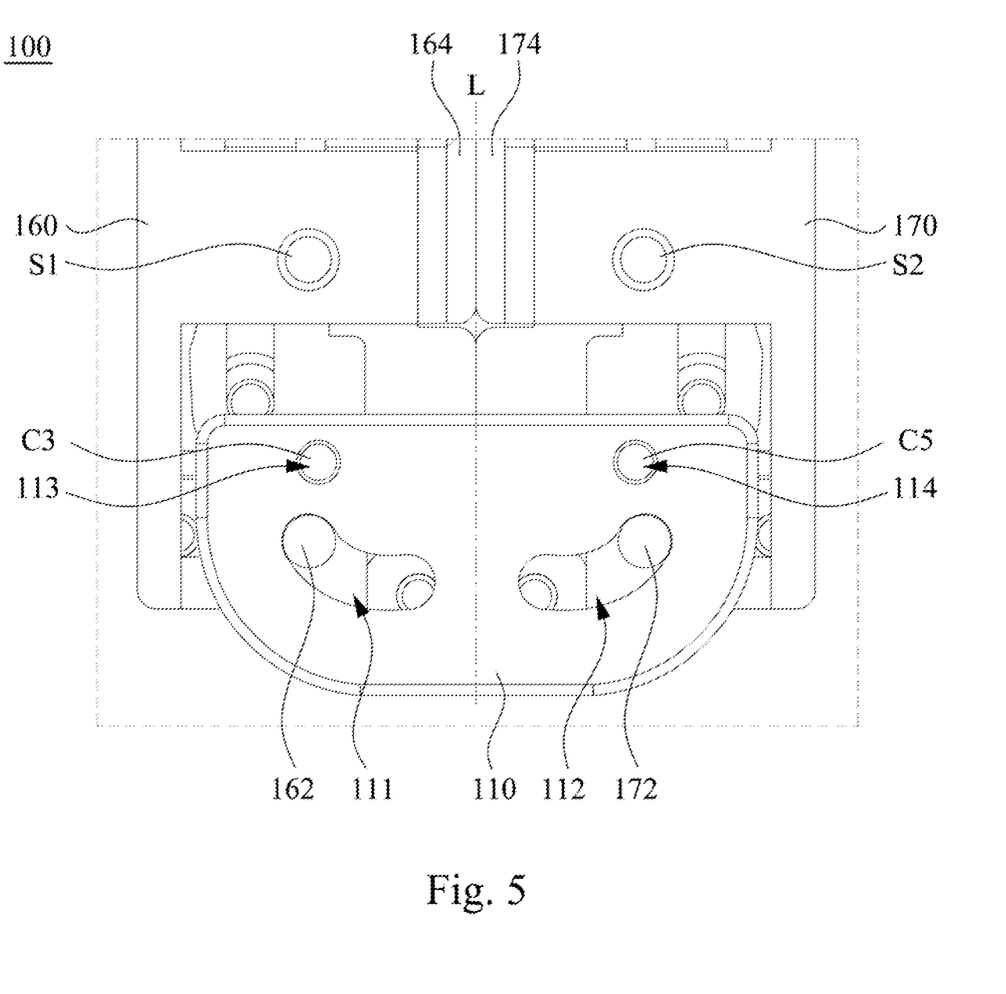
FIG. 5 is a partial cross-sectional view of the foldable assembly of FIG. 3 in a closed state.
Figure 6:
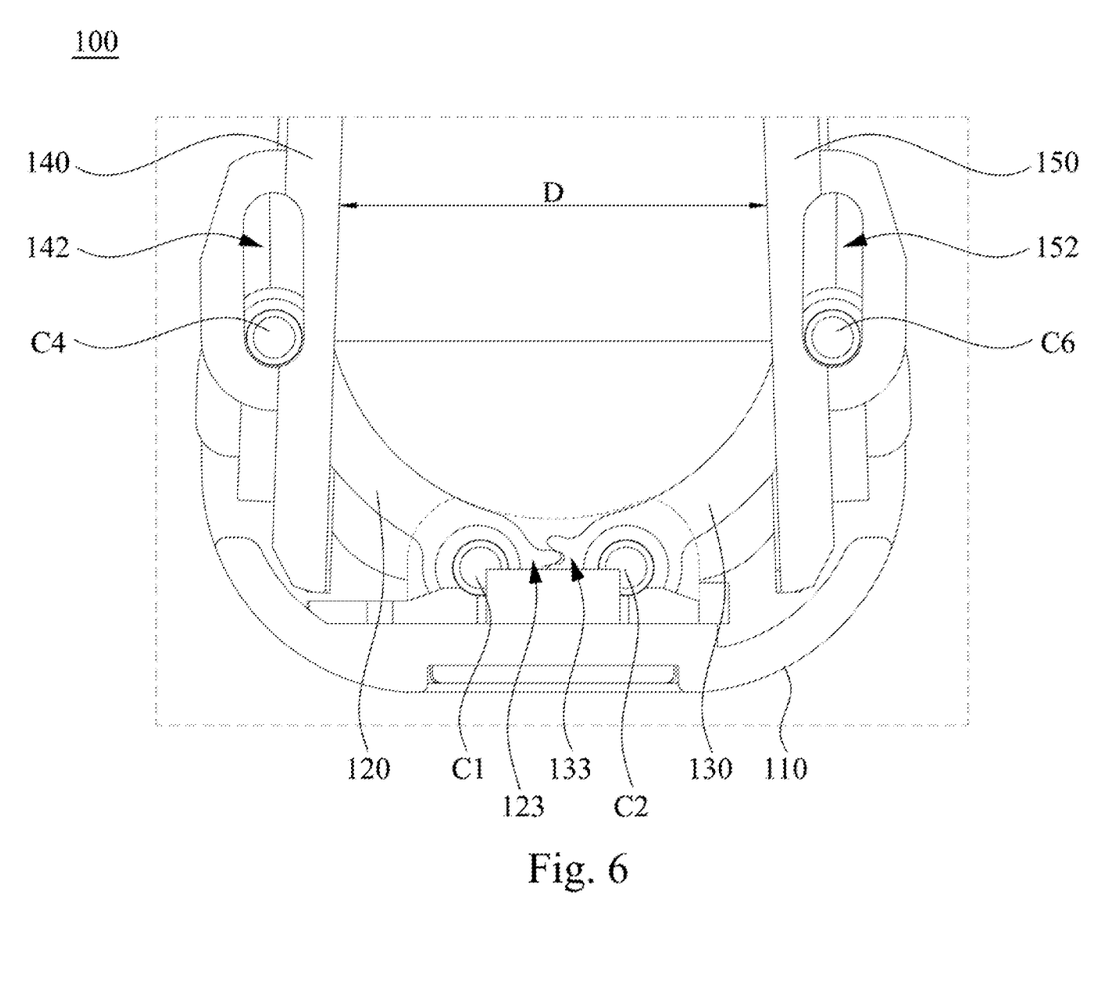
FIG. 6 is a partial cross-sectional view of the foldable assembly of FIG. 4 in a closed state.

Specifically, the left hinge plate 140 is pivotally connected to the main body 110, the fourth cylinder C4 passed through the left second through hole 122 of the left swing arm 120 is located in the left second guide slot 142 of the left hinge plate 140, the right hinge plate 150 is pivotally connected to the main body 110, the sixth cylinder C6 passed through the right second through hole 132 of the right swing arm 130 is located in the right second guide slot 152 of the right hinge plate 150, the left positioning pole 162 of the left housing 160 is located in the left first guide slot 111, and the right positioning pole 172 of the right housing 170 is located in the right first guide slot 112; therefore, the left hinge plate 140 and the left housing 160 may be closed along different trajectories, the right hinge plate 150 and the right housing 170 may be closed along different trajectories, so that when the foldable assembly 100 is in a closed state, the left hinge plate 140 and the right hinge plate 150 are not in contact with each other (as shown in FIG. 6), and the left frame 164 of the left housing 160 is in contact with the right frame 174 the right housing 170 (as shown in FIG. 5). Such a configuration enable the object on the left hinge plate 140 and the right hinge plate 150 (such as the flexible display panel 210) to have a larger bend radius when the foldable assembly 100 is closed, thereby reducing bending stress and related defects, and improving the reliability of the object. In addition, in the closed state of the foldable assembly 100, there is no gap between the left housing 160 and the right housing 170, so that the object in the foldable assembly 100 may be protected by the left housing 160 and the right housing 170.

In following description, the foldable assembly 100 in an unfolded state and other structures will be explained.

Figure 3:
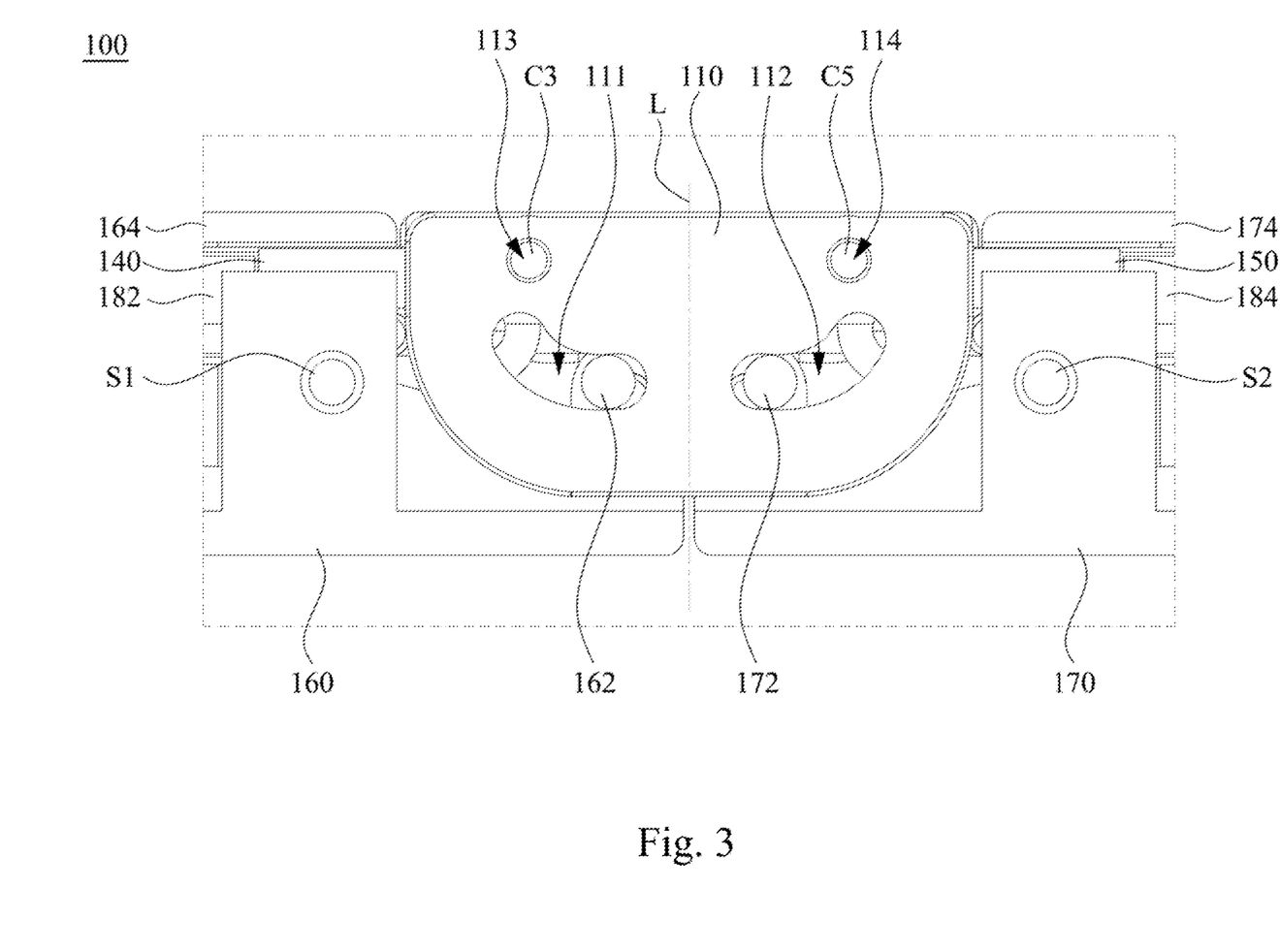
FIG. 3 is a partial cross-sectional view of the foldable assembly of FIG. 1 after assembled and in an unfolded state.

FIG. 3 is a partial cross-sectional view of the foldable assembly 100 of FIG. 1 after assembled and in the unfolded state. When the left housing 160 and the right housing 170 of the foldable assembly 100 are in the unfolded state, the left positioning pole 162 is located at an end of the left first guide slot 111 close to a center line L of the main body 110, and the right positioning pole 172 is located at an end of the right first guide slot 112 close to the center line L of the main body 110. In such a condition, the left hinge plate 140 and the right hinge plate 150 are in the unfolded state as well.

Figure 4:
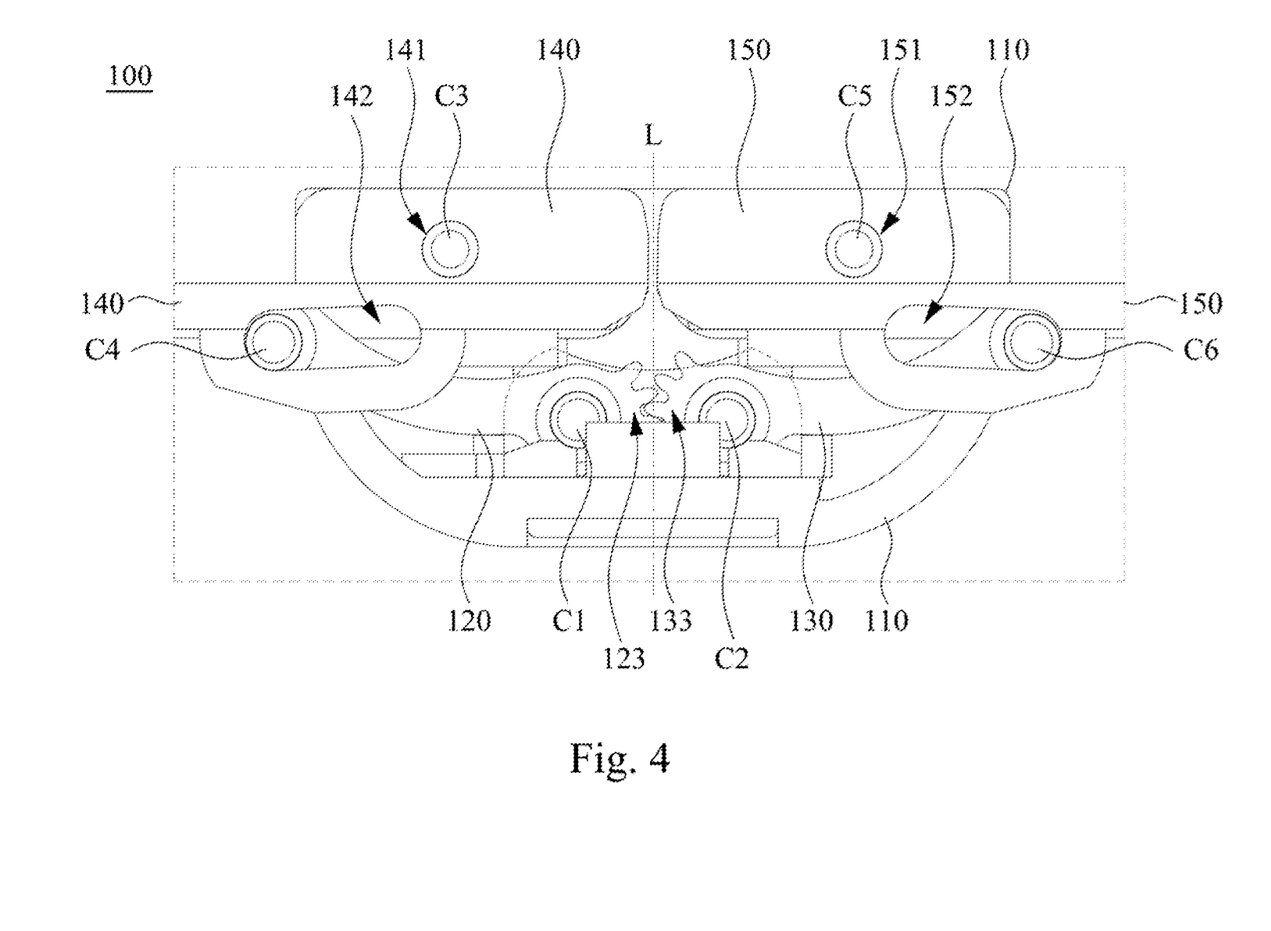
FIG. 4 is another partial cross-sectional view of the foldable assembly of FIG. 3.
Figure 8:
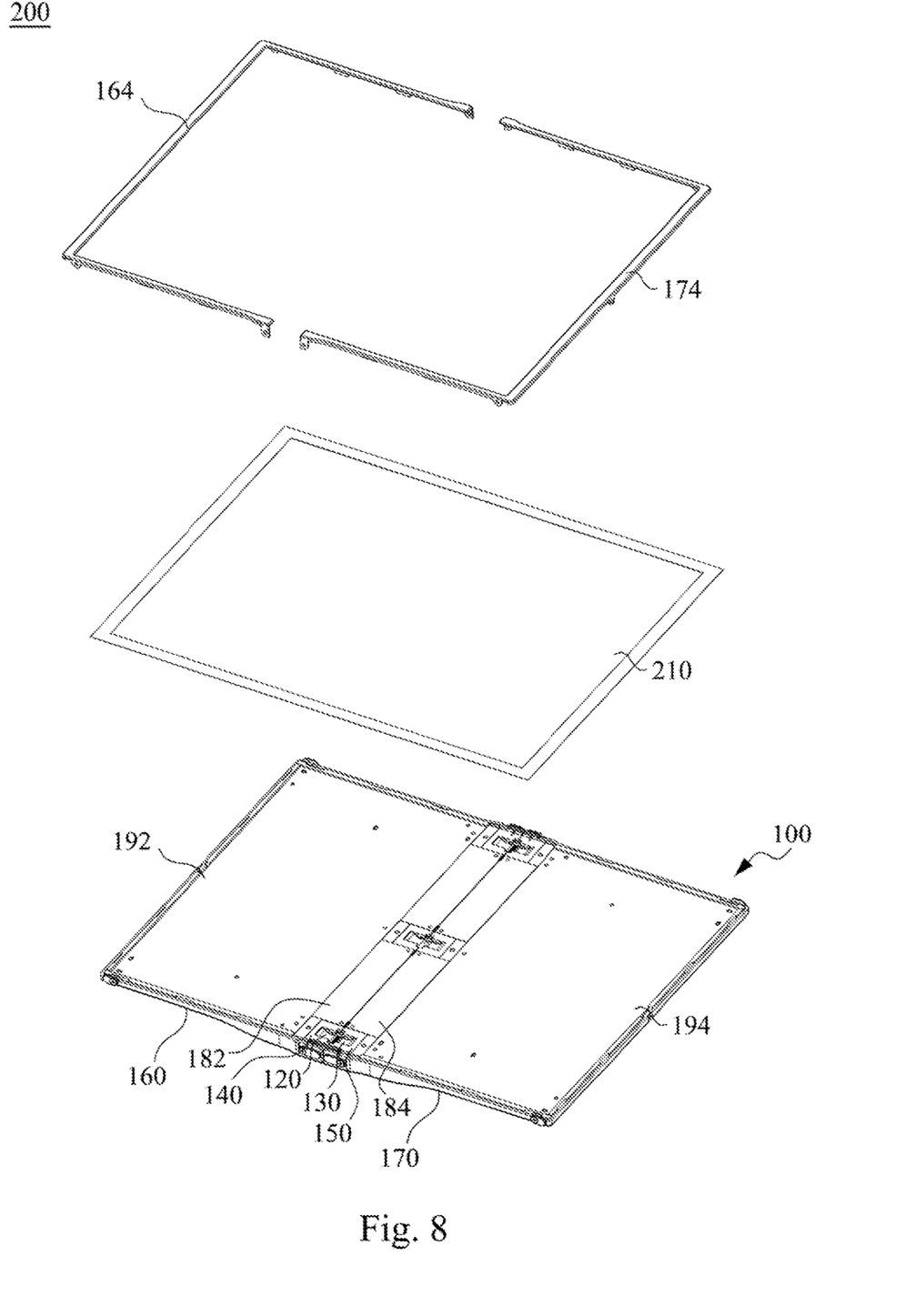
FIG. 8 is an explode view of a foldable display device according to one embodiment of the present disclosure.

FIG. 4 is another partial cross-sectional view of the foldable assembly 100 of FIG. 3, and the cross-sectional position is inside the main body 110. When the foldable assembly 100 is in the unfolded state, the fourth cylinder C4 is located at an end of the left second guide slot 142 of the left hinge plate 140 away from a center line L of the main body 110, and the sixth cylinder C6 is located at an end of the right second guide slot 152 of the right hinge plate 150 away from the center line L of the main body 110. When the left hinge plate 140 and the right hinge plate 150 are in the unfolded state, the top surface of the left hinge plate 140 is coplanar with the top surface of the right hinge plate 150, so that the flexible display panel 210 may be disposed on the left hinge plate 140 and the right hinge plate 150 (as shown in FIG. 8).

As shown in FIG. 2 and FIG. 4, in this embodiment, the left swing arm 120 of the foldable assembly 100 may further have a first gear structure 123. The first gear structure 123 is located on a side of the left swing arm 120 close to the left first through hole 121. Moreover, the right swing arm 130 of the foldable assembly 100 may further have a second gear structure 133. The second gear structure 133 is located on a side of the right swing arm 130 close to the right first through hole 131. The first gear structure 123 and the second gear structure 133 mesh with each other, so that the left swing arm 120 and the right swing arm 130 may be unfolded and closed symmetrically. In addition, the cross-sectional profile of the left swing arm 120 and the cross-sectional profile the right swing arm 130 are approximately arc-shaped. The left second guide slot 142 of the left hinge plate 140 and the right second guide slot 152 of the right hinge plate 150 are linear.

As shown in FIG. 2 and FIG. 3, the left first guide slot 111 and the right first guide slot 112 located in the main body 110 are arc-shaped. Since the left positioning pole 162 of the left housing 160 is located in the left first guide slot 111, and the right positioning pole 172 of the right housing 170 is located in the right first guide slot 112, the left hinge plate 140 and the left housing 160 may therefore be closed along the different guide slots, and the right hinge plate 150 and the right housing 170 may be closed along the different guide slots.

As shown in FIG. 1 and FIG. 2, in this embodiment, the foldable assembly 100 may further include a left junction plate 182, a right junction plate 184, a left support plate 192, and a right support plate 194. The left junction plate 182 is arranged on the left hinge plate 140 and disposed along the left side of the main body 110. The left junction plate 182 has a threaded hole configured to be fastened by a screw passed through the left hinge plate 140. The right junction plate 184 is arranged on the right hinge plate 150 and disposed along the right side of the main body 110. The right junction plate 184 has a threaded hole configured to be fastened by a screw passed through the right hinge plate 150. The left support plate 192 is disposed on the left junction plate 182. The right support plate 194 is disposed on the right junction plate 184. The left junction plate 182 is configured so that the left support plate 192 may be connected to the left hinge plate 140. The right junction plate 184 is configured so that the right support plate 194 may be connected to the right hinge plate 150. As a consequence, the left junction plate 182 and the left support plate 192 may be unfolded and closed simultaneously. Moreover, in some embodiments, the left support plate 192 and a right support plate 194 may be configured to support the flexible display panel 210 (shown in FIG. 8).

In following description, the foldable assembly 100 in a closed state will be explained.

FIG. 5 is a partial cross-sectional view of the foldable assembly 100 of FIG. 3 in a closed state. As shown in FIG. 3 and FIG. 5, when the foldable assembly 100 is converted from the unfolded state in FIG. 3 to the closed state in FIG. 5, the left housing 160 and the right housing 170 pivot by the left positioning pole 162 and the right positioning pole 172 respectively sliding in the left first guide slot 111 and the right first guide slot 112. When the left housing 160 and the right housing 170 are in the closed state, the left positioning pole 162 is located at an end of the left first guide slot 111 away from the center line L of the main body 110, and the right positioning pole 172 is located at an end of the right first guide slot 112 away from the center line L of the main body 110. In addition, when the foldable assembly is in the closed state, there is no gap between the left frame 164 of the left housing 160 and the right frame 174 of the right housing 170, so that the object in the foldable assembly 100 (e.g., the flexible display panel of FIG. 10) may by protected by the left housing 160 and the right housing 170.

FIG. 6 is a partial cross-sectional view of the foldable assembly 100 of FIG. 4 in the closed state. As shown in FIG. 4 and FIG. 6, when the foldable assembly 100 is converted from the unfolded state in FIG. 4 to the closed state in FIG. 6, the left hinge plate 140 and the right hinge plate 150 pivot by the fourth cylinder C4 and the sixth cylinder C6 respectively sliding in the left second guide slot 142 and the right second guide slot 152. When the foldable assembly 100 is in the closed state, the fourth cylinder C4 is located at an end of the left second guide slot 142 of the left hinge plate 140 close to the center line L of the main body 110, and the sixth cylinder C6 is located at an end of the right second guide slot 152 of the right hinge plate 150 close to the center line L of the main body 110. The left hinge plate 140 and the right hinge plate 150 are separated by a distance D, so that the object on the left hinge plate 140 and the right hinge plate 150 (such as the flexible display panel 210) may have a larger bend radius when the foldable assembly 100 is closed, thereby reducing bending stress and related defects, and improving the reliability of the object in the foldable assembly 100.

In following statement, other type of the foldable assembly will be described.

Figure 7:
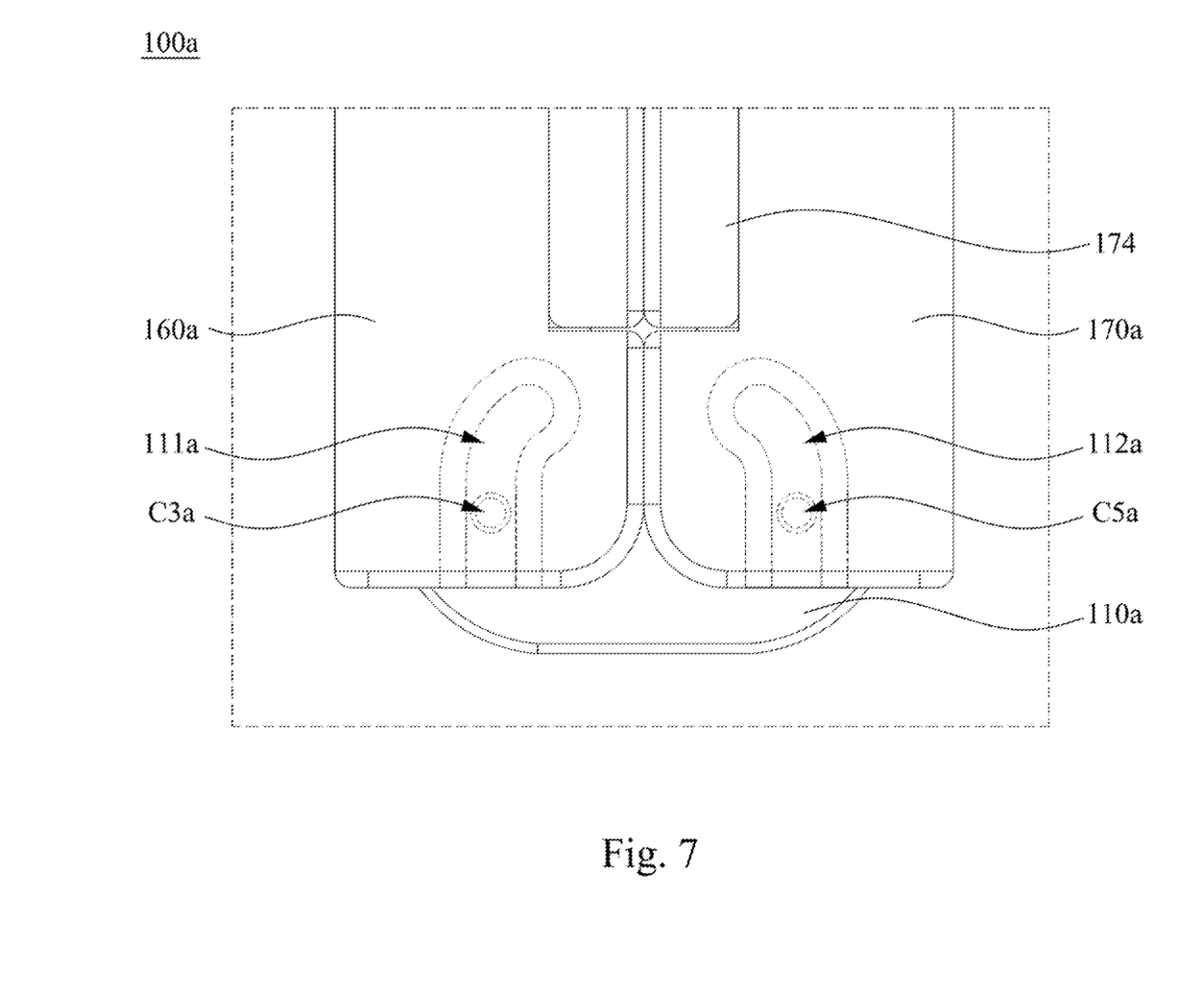
FIG. 7 is a side view of a foldable assembly according to another embodiment of the present disclosure.

FIG. 7 is a side view of a foldable assembly 100a according to another embodiment of the present disclosure. As shown in FIG. 7, the foldable assembly 100a includes a main body 110a, a left first guide slot 111a, a right first guide slot 112a, a left housing 160a and a right housing 170a. The difference between the foldable assembly 100a and the foldable assembly 100 of FIG. 5 is that the left first guide slot 111a and the right first guide slot 112a are respectively located in the left housing 160a and the right housing 170a. In addition, a third cylinder C3a extends from the left first positioning hole 113a of the main body 110a into the left first guide slot 111a, and a fifth cylinder C5a extends from the right first positioning hole 114a of the main body 110a into the right first guide slot 112a. In such a configuration, the third cylinder C3a and the fifth cylinder C5a may respectively serve as the left positioning pole 162 and the right positioning pole 172 of FIG. 5 and slide in the left first guide slot 111a and the right first guide slot 112a, such that the foldable assembly 100a does not need the left positioning pole 162 and the right positioning pole 172 of FIG. 5, thereby reducing components and manufacturing costs.

It is to be noted that the connection relationships and the advantages of the elements described above will not be repeated in the following description. In the following statement, a foldable display device 200 having the foldable assembly 100 will be described.

FIG. 8 is an explode view of the foldable display device 200 according to one embodiment of the present disclosure. As shown in FIG. 8, the foldable display device 200 includes the flexible display panel 210 and the foldable assembly 100 mentioned above. The flexible display panel 210 may include a reflective display panel such as an electronic paper. The flexible display panel 210 is disposed on the left support plate 192 and the right support plate 194 of the foldable assembly 100, so that when the foldable display device 200 is in an unfolded state and a closed state, the flexible display panel 210 may be flattened and folded respectively. In addition, during the closed state of the foldable display device 200, the left housing 160 and the right housing 170 of the foldable assembly 100 may shield the flexible display panel 210 from damages.

In this embodiment, the left frame 164 of the left housing 160 is disposed along the edge of the left half of the flexible display panel 210. The right frame 174 is disposed along the edge of the right half of the flexible display panel 210. The left frame 164 and the right frame 174 may secure the edge of the flexible display panel 210, so that the flexible display panel 210 may be positioned on the foldable assembly 100 to prevent the flexible display panel 210 from shifting in the foldable display device 200.

Figure 9:
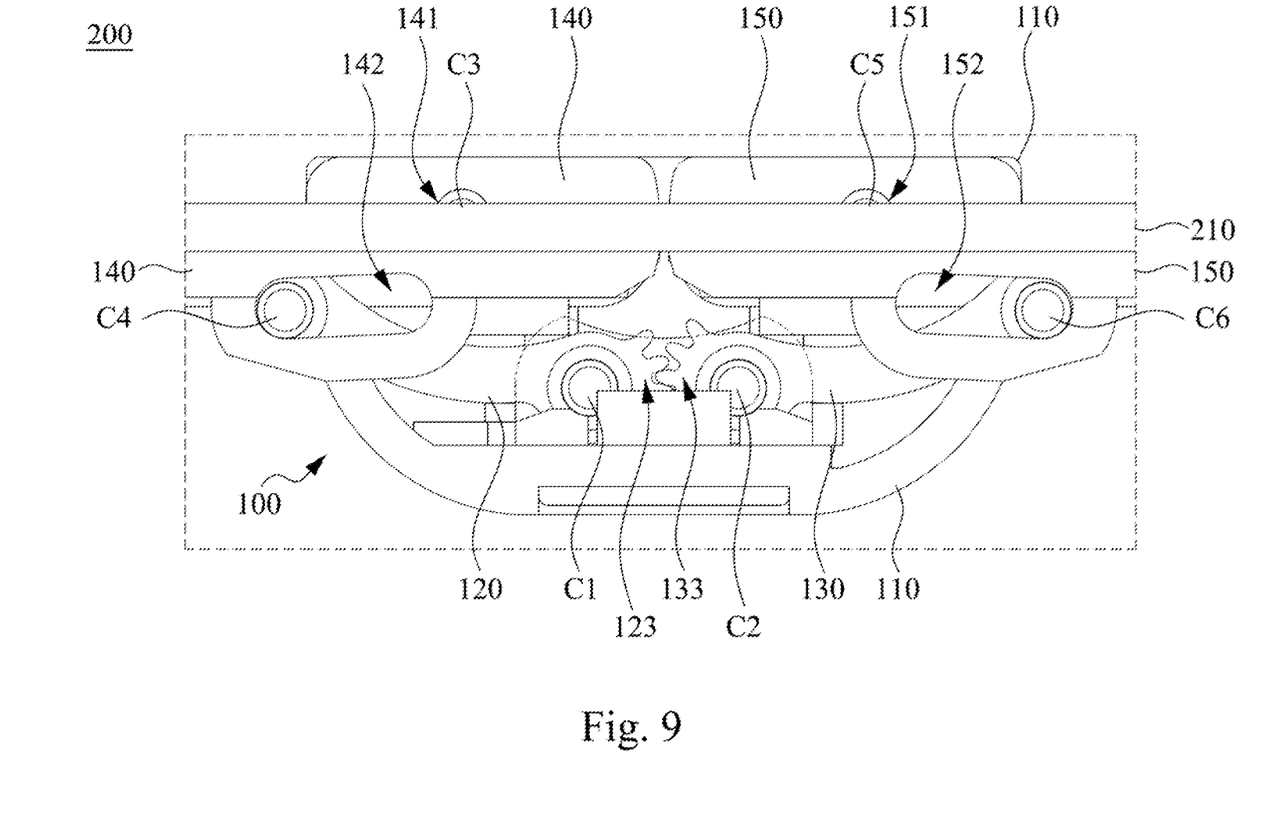
FIG. 9 is a partial cross-sectional view of the foldable display device of FIG. 8 after assembled and in an unfolded state.

FIG. 9 is a partial cross-sectional view of the foldable display device 200 of FIG. 8 after assembled and in the unfolded state. During the unfolded state of the foldable display device 200, the top surface of the left hinge plate 140 is coplanar with the top surface of the right hinge plate 150, and the flexible display panel 210 is flatten on the left hinge plate 140 and the right hinge plate 150. In this embodiment, the top surface of the flexible display panel 210 is slightly lower than the upper edge of the main body 110.

Figure 10:
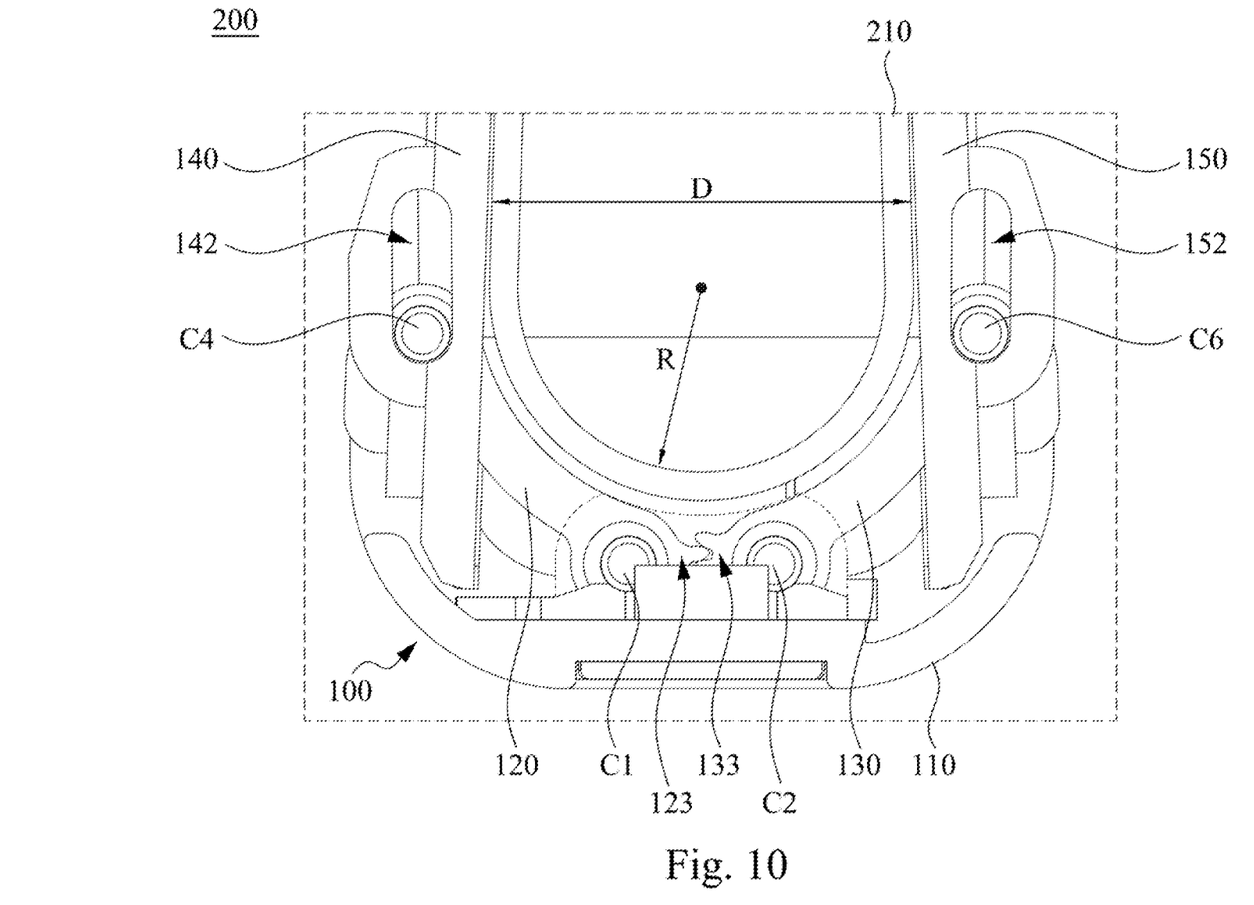
FIG. 10 is a partial cross-sectional view of the foldable display device of FIG. 9 in a closed state.

FIG. 10 is a partial cross-sectional view of the foldable display device 200 of FIG. 9 in the closed state. During the closed state of the foldable display device 200, the left hinge plate 140 and the right hinge plate 150 are separated by a distance D, so that the flexible display panel 210 on the left hinge plate 140 and the right hinge plate 150 may have a larger bend radius R. Compared with conventional designs, such a configuration has less bending stress and thereby preventing the flexible display panel 210 from the defects caused by bending and improving the reliability of the foldable display device 200. Moreover, the left housing 160 and the right housing 170 of the foldable assembly 100 are in contact with each other and have no gap therebetween (as shown in FIG. 5), so that the left housing 160 and the right housing 170 may shield the flexible display panel 210 from damages.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A foldable assembly, comprising:
    a main body comprising a positioning holder, wherein a side of the main body has a left first positioning hole and a right first positioning hole;
    a left housing pivotally connected to the main body;
    a right housing pivotally connected to the main body;
    a left first guide slot and a right first guide slot located in the main body or respectively located in the left housing and the right housing;
    a left swing arm having a left first through hole and a left second through hole, wherein the left first through hole is pivotally connected to the positioning holder of the main body by a first cylinder;
    a right swing arm having a right first through hole and a right second through hole, wherein the right first through hole is pivotally connected to the positioning holder of the main body by a second cylinder;
    a left hinge plate having a left second positioning hole and a left second guide slot, wherein the left second positioning hole and the left first positioning hole of the main body are passed through by a third cylinder such that the left hinge plate is pivotally connected to the main body, and the left second guide slot and the left second through hole of the left swing arm are passed through by a fourth cylinder such that the fourth cylinder is configured to slide in the left second guide slot; and
    a right hinge plate having a right second positioning hole and a right second guide slot, wherein the left first guide slot and the right first guide slot are arc-shaped, the left second guide slot and the right second guide slot are linear, the right second positioning hole and right first positioning hole of the main body are passed through by a fifth cylinder such that the right hinge plate is pivotally connected to the main body, and the right second guide slot and the right second through hole of the right swing arm are passed through by a sixth cylinder such that the sixth cylinder is configured to slide in the right second guide slot.

2. The foldable assembly of claim 1, wherein the left swing arm and the right swing arm respectively have a first gear structure and a second gear structure, and the first gear structure and the second gear structure mesh with each other.

3. The foldable assembly of claim 1, wherein when the left housing and the right housing are in an unfolded state, the fourth cylinder is located at an end of the left second guide slot away from a center line of the main body, and the sixth cylinder is located at an end of the right second guide slot away from the center line of the main body.

4. The foldable assembly of claim 1, wherein when the left housing and the right housing are in a closed state, the fourth cylinder is located at an end of the left second guide slot close to a center line of the main body, and the sixth cylinder is located at an end of the right second guide slot close to the center line of the main body.

5. The foldable assembly of claim 1, wherein the left housing has a left positioning pole disposed in the left first guide slot located in the main body, and the right housing has a right positioning pole disposed in the right first guide slot located in the main body.

6. The foldable assembly of claim 5, wherein when the left housing and the right housing are in an unfolded state, the left positioning pole is located at an end of the left first guide slot close to a center line of the main body, and the right positioning pole is located at an end of the right first guide slot located in the main body close to the center line of the main body.

7. The foldable assembly of claim 5, wherein when the left housing and the right housing are in a closed state, the left positioning pole is located at an end of the left first guide slot away from a center line of the main body, and the right positioning pole is located at an end of the right first guide slot away from the center line of the main body.

8. The foldable assembly of claim 1, wherein the third cylinder extends from the left first positioning hole of the main body into the left first guide slot located in the left housing, and the fifth cylinder extends from the right first positioning hole of the main body into the right first guide slot located in the right housing.

9. The foldable assembly of claim 1, wherein a cross-sectional profile of the left swing arm and a cross-sectional profile of the right swing arm are arc-shaped.

10. The foldable assembly of claim 1, further comprising:
    a left junction plate arranged on the left hinge plate and disposed along a left side of the main body; and
    a right junction plate arranged on the right hinge plate and disposed along a right side of the main body.

11. The foldable assembly of claim 10, further comprising:
    a left support plate disposed on the left junction plate; and a right support plate disposed on the right junction plate, wherein the left support plate and the right support plate are configured to support a flexible display panel.

12. A foldable display device, comprising:
a foldable assembly comprising:
a main body comprising a positioning holder, wherein a side of the main body has a left first positioning hole and a right first positioning hole;
a left housing pivotally connected to the main body;
a right housing pivotally connected to the main body;
a left first guide slot and a right first guide slot located in the main body or respectively located in the left housing and the right housing;
a left swing arm having a left first through hole and a left second through hole, wherein the left first through hole is pivotally connected to the positioning holder of the main body by a first cylinder;
a right swing arm having a right first through hole and a right second through hole, wherein the right first through hole is pivotally connected to the positioning holder of the main body by a second cylinder;
a left hinge plate having a left second positioning hole and a left second guide slot, wherein the left second positioning hole and the left first positioning hole of the main body are passed through by a third cylinder such that the left hinge plate is pivotally connected to the main body, and the left second guide slot and the left second through hole of the left swing arm are passed through by a fourth cylinder such that the fourth cylinder is configured to slide in the left second guide slot; and
a right hinge plate having a right second positioning hole and a right second guide slot, wherein the left first guide slot and the right first guide slot are arc-shaped, the left second guide slot and the right second guide slot are linear, the right second positioning hole and right left first positioning hole of the main body are passed through by a fifth cylinder such that the right hinge plate is pivotally connected to the main body, and the right second guide slot and the right second through hole of the right swing arm are passed through by a sixth cylinder such that the sixth cylinder is configured to slide in the right second guide slot; and
a flexible display panel disposed on the foldable assembly.

13. The foldable display device of claim 12, wherein the left housing has a left frame, the left frame is disposed along an edge of a left half of the flexible display panel, the right housing has a right frame, and the right frame is disposed along an edge of a right half of the flexible display panel.

14. The foldable display device of claim 12, wherein the left swing arm and the right swing arm respectively have a first gear structure and a second gear structure, and the first gear structure and the second gear structure mesh with each other.

15. The foldable display device of claim 12, further comprising:
a left junction plate arranged on the left hinge plate and disposed along a left side of the main body; and
a right junction plate arranged on the right hinge plate and disposed along a right side of the main body.

16. The foldable display device of claim 15, further comprising:
a left support plate disposed on the left junction plate; and
a right support plate disposed on the right junction plate, wherein the flexible display panel is located on the left support plate and the right support plate.

* * * * *